Oct. 15, 1929.                G. R. SHUCK                 1,731,941
                            ELECTRIC METER
                      Filed March 17, 1927      2 Sheets-Sheet 1
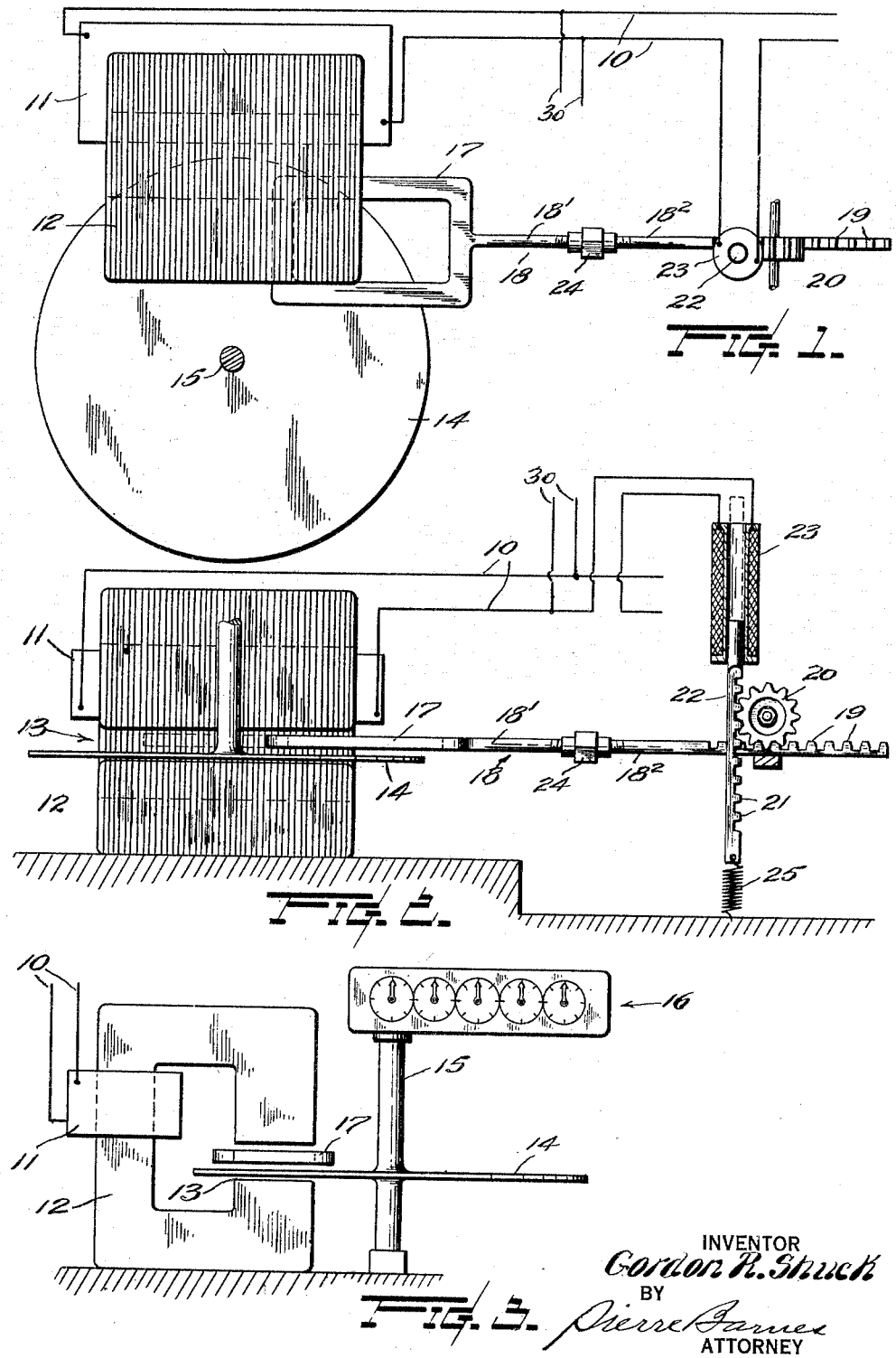

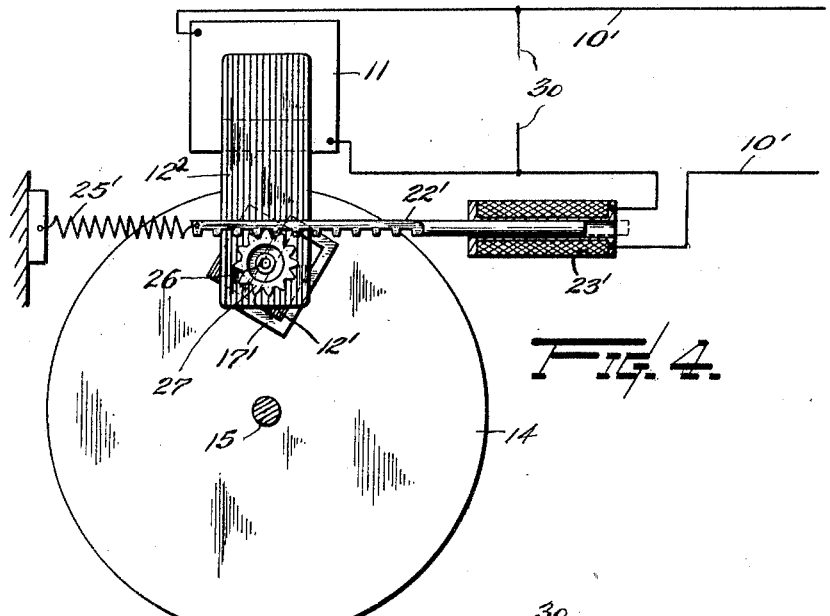
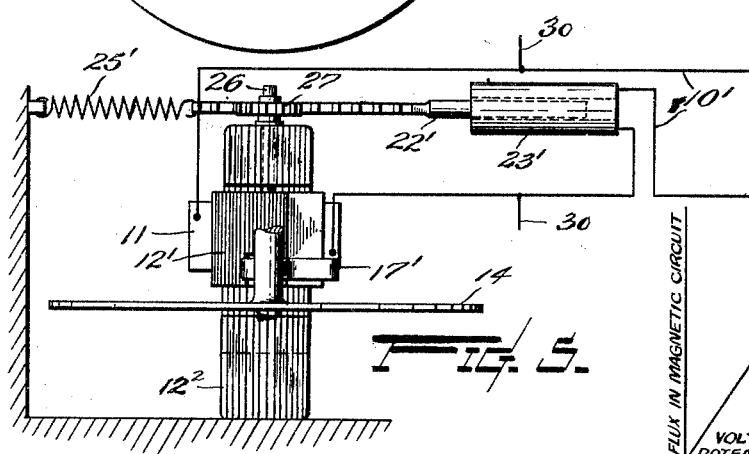
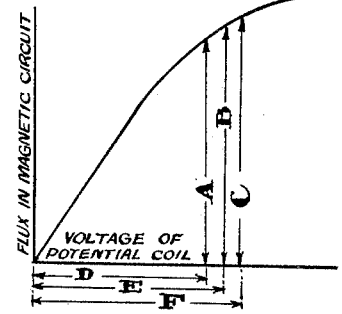
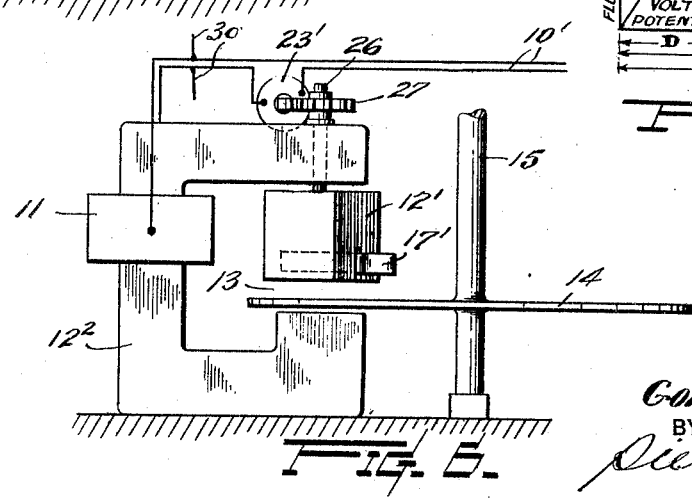

Patented Oct. 15, 1929

1,731,941

UNITED STATES PATENT OFFICE

GORDON R. SHUCK, OF SEATTLE, WASHINGTON, ASSIGNOR TO DUNCAN ELECTRIC MANUFACTURING COMPANY, OF LA FAYETTE, INDIANA, A CORPORATION OF ILLINOIS

ELECTRIC METER

Application filed March 17, 1927. Serial No. 176,108.

This invention relates to electric meters and, more especially, to a meter for recording kilo-volt ampere-hours.

The object of the invention, generally stated, is to produce a meter of this character which is of simple and durable construction, efficient in operation, and capable of measuring the energy of electric currents of either a single phase or a polyphase circuit.

More specific objects and advantages of the invention will appear in the following description.

The invention consists in the novel use within the field of an electro-magnetic circuit of a secondary electric-conducting body which is arranged to be moved by a load-current operated device responsive to variations of load current in a manner to effect the rotation of a meter disk at a speed proportional to the product of volts and amperes.

The invention is illustrated in the accompanying drawings, shown somewhat diagrammatically, in which,—

Figure 1 is a plan view showing one embodiment of the invention; Fig. 2 is a front elevation thereof partly in vertical section; and Fig. 3 is a side elevation of the same and including the representation of a counter which is omitted from the other views. Fig. 4 is a plan view, partly in horizontal section, showing a modified form of the invention; and Figs. 5 and 6 are front and side elevations, respectively, of the construction shown in Fig. 4. Fig 7 is a diagram—representing graphically the relation between flux in a magnetic circuit and the voltage of a potential coil.

Referring to Figs. 1 to 3, inclusive, the reference numeral 10 represents mains connected to a source (not shown) of an alternating electric current and includes, in series, the winding of a load-current actuated device of known construction as, for example, a solenoid 23, as shown, and the potential coil 11 of an electro-magnetic circuit. As shown, this electro-magnetic circuit comprises an iron core 12 of substantially the form of a letter C with an air-gap, which is indicated by 13.

Extending into said air-gap is a rotary conducting disk 14 which is operatively connected through the medium of its spindle 15 and by other known or suitable means with the recording devices of a counter 16 shown in Fig. 3.

Arranged for reciprocatory movement, into and from said air-gap, is a phasing plate or a "shading coil" 17 which may be of any suitable shape, and as illustrated in Figs. 1 to 3 is represented as a rectangular frame having a stem 18. The stem 18 is provided with a series of rack teeth 19 engaging the teeth of a spur pinion 20 which latter is also in engagement with the rack teeth 21 provided upon the plunger 22 of the solenoid 23 above referred to. 25 represents a retractile spring connected to the plunger 22. 30 represents leads of a load circuit.

In operation, the potential coil 11 functions to set up an alternating magnetic field in the magnetic circuit 12, substantially all of the flux passing through the meter disk 14 while but a part of the flux passes through the shading coil 17. Assuming a constant potential, with a consequent unvarying magnitude of the magnetic field, the presence of the shading coil in the air-gap will cause such magnetic field to shift in a manner to produce a torque with a consequent rotation of the disk. The position of the shading coil in the magnetic field, as will be understood, determines the magnitude of the torque which, in turn, determines the rotary speed of the disk. The position of the shading coil 17 in the magnetic field, however, is regulated by means of the series solenoid through the medium of the rack and pinion mechanism above described. At zero current the solenoid is inert and the shading coil 17 is withdrawn (by the power of the spring 25) with respect to the magnetic field, thereby reducing the torque until it is incapable of imparting movement to the disk.

But when a current passing through the series solenoid is increased, the solenoid is energized sufficiently to effect movement to the shading coil into the magnetic field which will apply a rotary force to the meter disk. This rotary force can be made proportional, or nearly so, to the current flowing in the series solenoid by a suitable motion transmission mechanism, hence the speed of the disk is proportional to the current, assuming a constant magnitude of the magnetic field or a constant potential.

Again, assuming any fixed current in the series solenoid, a change in the voltage of the potential coil 11 results in changing the magnitude of the magnetic field and, in consequence, the magnitude of the torque with respect to the disk. Moreover, at any stationary position of the shading coil, the speed of the disk may be made proportional to the voltage within commercial limits of change—say to a ten per cent increase or decrease—which is accomplished by operating the magnetic circuit at the proper density.

In order to explain the term "proper density" reference is had to Fig. 7 illustrating graphically the relation between the flux in the magnetic circuit 12 and the voltage of the potential coil 11. E denotes the normal operating voltage of the meter; B, the corresponding normal flux. D, denotes a 10 per cent decrease in voltage; A, the corresponding flux. F denotes a 10 per cent increase in voltage; C, the corresponding flux. The torque, and consequently the speed, of the meter disk varies with the square of the flux, or nearly so. Therefore the magnetic circuit in the present invention operates at such a density that a 10 per cent increase and a 10 per cent decrease of voltage will produce fluxes, squared values of which will be proportional to the voltages, that is $\frac{D}{F} = \frac{A^2}{C^2}$.

From the foregoing description, it is seen that the meter disk is rotated either proportional to the current in the series solenoid with a constant potential, or proportional to the voltage with a constant current, and, since the effects of the current and voltage are independent of the phase angle between the current and voltage, I provide an electric meter wherein the disk rotates at speeds proportional to the product of volts and amperes; and, connecting the meter disk by means of a suitable train of gears (of known construction) with suitable registering devices (see Fig. 3) I provide a volt-ampere-hour meter.

In Figs. 4, 5 and 6, I illustrate a modified construction of my meter embodying the principles set forth above with reference to the meter shown in Figs. 1, 2 and 3.

In the modified form, the core $12^2$ of the magnetic circuit is provided with a pole piece $12^1$ which is mounted to rotate with a spindle 26 extending through the core as indicated in Figs. 5 and 6. The pole piece $12^1$, as shown, is of a substantially rectangular form and is slotted from below to provide bifurcations, upon one of which is mounted a shading coil $17^1$ to carry the latter in revoluble relation with respect to the axis of the spindle 26.

Rigid with said spindle 26 is a spur pinion 27 engaging rack teeth provided on the plunger $22^1$ of a solenoid $23^1$ in series with the mains $10^1$. $25^1$ represents a retractile spring for the plunger $22^1$.

A current in the series solenoid $23^1$ will actuate the pinion 27 to rotate the pole piece $12^1$ thereby producing a tangential component of torque to effect rotatory movement to the disk 14.

It is to be understood that when the current in the series solenoid is zero the rotary position of the core section $12^1$ is such as will produce a substantially radially shifting field having no effective rotative torque.

In adjusting the shading coil it is desirable to position the same so that when the circuit current is zero, the shading coil will produce a torque just sufficient to overcome the static friction of the disk spindle and the registering mechanism which is operated by the disk, thus providing a no-load friction-compensating device which enables the disk to be readily started with an expenditure of a minimum of current. Any suitable known devices may be utilized for locating the shading coil for friction-compensating as above referred to; an example of which is illustrated in Figs. 1 and 2, the same consisting in making the coil stem in two complementary parts—as $18^1$ and $18^2$—and adjustably uniting the same by means of a coupling sleeve 24 which is connected with the stem parts by means of right and left hand screw threads, so that by turning the sleeve in one rotary direction or the other the effective length of the stem may be regulated.

Furthermore, I expect to use in practice drag magnets (not shown) of known construction and operation as exemplified in an ordinary induction watt-hour meter, and likewise to employ any known type of counter or register device to be driven by the meter disk as in the ordinary watt-hour meter.

Shading coils have hitherto been employed in a magnetic field to produce a torque with respect to a meter disk to provide friction-compensation and light-load adjustment, as in some induction watt-hour meters.

It is to be noted that the operative connections between the solenoid plunger and the shading coil, as shown in the drawings, is for illustrative purposes only and not restrictive; as, in practice, known means may advantageously be adopted to impart variable motion to the shading coil to ensure disk torque and disk speed proportional to the current, assuming a constant potential.

While I have shown and described a solenoid as one means for moving the shading coil it is to be understood that it is shown for illustrative purposes only, as other known means may obviously be employed instead, so long as such means is capable of acting to move the shading coil responsive to changes in the load current of the circuit whose energy is to be metered.

The term shading coil or phasing plate as herein used is to be understood to include any electrically conducting member of such shape, size and characteristics as will cause a magnetic field to shift back and forth in such a manner as to produce a torque for a meter disk.

What I claim, is,—

1. In an integrating type alternating current meter, the combination of a potential coil, a magnetic circuit, whose flux is produced by said potential coil, an air gap in said magnetic circuit, a metal disk free to rotate in said magnetic circuit, a shading coil also free to move in said air gap, and load current operated means for controlling movement of said shading coil, all cooperating to produce rotation of the disk directly proportional to the product of volts impressed on said potential coil and load current.

2. In an integrating type alternating current meter, the combination of a potential coil, a magnetic circuit, whose flux is produced by said potential coil, an air gap in said magnetic circuit, a shading coil also free to move in said air gap, a load current series solenoid operatively connected to said shading coil, all cooperating to produce a rotation of the disk directly proportional to the product of the volts impressed in the potential coil, and the load current.

3. In an integrating type alternating current meter, the combination of a potential coil, a magnetic circuit linking with said potential coil, an air gap in said magnetic circuit, a metal disk free to rotate in said magnetic circuit, a shading coil also free to move in said air gap, load current operated means for controlling movement of said shading coil, adjustable means for changing the position of the shading coil at zero load current, all cooperating to perform two functions, one, rotation of the disk proportional to the product of volts of said potential coil and load current, the second, to produce a torque on the disk at zero load current to overcome static friction.

Signed at Seattle, Washington, this 4th day of March, 1927.

GORDON R. SHUCK.